UNITED STATES PATENT OFFICE.

ARTHUR WEINBERG AND RICHARD HERZ, OF FRANKFORT-ON-THE-MAIN, GERMANY, ASSIGNORS TO LEOPOLD CASSELLA & CO., OF FRANKFORT-ON-THE-MAIN, GERMANY.

PROCESS OF MAKING BLUE SULFUR DYE.

SPECIFICATION forming part of Letters Patent No. 693,633, dated February 18, 1902.

Application filed August 24, 1901. Serial No. 73,177. (Specimens.)

*To all whom it may concern:*

Be it known that we, ARTHUR WEINBERG and RICHARD HERZ, citizens of Prussia, and residents of Frankfort-on-the-Main, in the Province of Hesse-Nassau, Kingdom of Prussia, Germany, have invented certain new and useful Improvements in Blue Sulfur Dye and Processes of Making Same, of which the following is a specification.

We have found that by heating para-dialkylamido-para-oxydiphenylamins with sulfur and alkaline sulfids under certain conditions hereinafter specified blue dyestuffs of very bright shade result. In the manufacture of these coloring-matters great care must be taken that the temperature during the so-called "melting process" does not exceed much 140° centigrade, as otherwise to a large extent or almost exclusively bluish-black to blackish coloring-matters of less value result instead of the pure blue dyestuffs. In the production of this color on a technical scale it is, however, difficult to entirely avoid the formation of these blackish by-products, even if the above-mentioned conditions are carefully observed. It is therefore of importance to find a reliable method of completely separating the pure dyestuff from the blackish dyeing products. Such a method has been described in our application for Letters Patent Serial No. 42,212. Now we have found another process of isolating the pure blue dyestuff by precipitating it from its solution in alkaline sulfids by means of chlorids of metals the sulfids of which are soluble in water, such as sodium, potassium, calcium, barium. The impurities remain in solution generally in form of their leuco compounds. The process may be illustrated by the following examples:

First. Twenty-five kilos para-dialkylamido-para-oxydiphenylamin are heated with fifty kilos sufid of sodium and 12.5 kilos sulfur for twenty-four hours to about 115° centigrade. The melt is then dissolved in six hundred liters water. One hundred and fifty kilos common salt are added, and the whole is well stirred for twelve hours. The precipitate is filtered off, well washed out with salt water, and pressed. For dyeing purposes it is best used in form of a paste, but may also be dried, preferably at a low temperature, and powdered.

Second. The melt obtained as described in the above example is dissolved in one thousand liters water at 30° centigrade. One hundred and twenty-five kilos of a solution of chlorid of calcium of 25° Baumé are then added, and the whole is stirred for twelve hours. In order to accelerate the precipitation, one hundred kilos common salt may be added besides. The precipitate, consisting of a lime compound of the pure dyestuff, which is rather difficultly soluble, and a certain quantity of insoluble organic and inorganic impurities, is filtered off, well washed out, and then redissolved by means of ten kilos sulfid of sodium and five kilos sodium carbonate in about seven hundred liters water of 50° centigrade. The solution is filtered in order to remove insoluble impurities, and the pure coloring-matter is precipitated from the solution by means of common salt.

The dyestuff possesses the properties described in our application for Letters Patent Serial No. 42,212.

Having now described our invention and in what manner the same is to be performed, what we claim is—

1. The process of producing pure blue sulfur dyestuffs by heating para-dialkylamido-para-oxydiphenylamin of the constitution

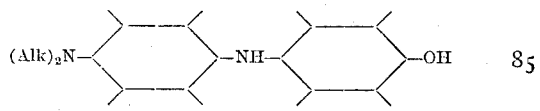

with sulfur and alkaline sulfids and isolating the pure color from the crude melt by precipitating an aqueous solution of the latter with chlorids of metals which form soluble sulfids.

2. The process of isolating the pure blue dyestuffs from the melt obtained from para-dialkylamido-para-oxydiphenylamin, sulfur and alkaline sulfids, by precipitating the aqueous solution of the crude melt with calcium chlorid, redissolving the precipitate by means of sodium sulfid and sodium carbonate, filtering the solution thus obtained, and precipitating the pure dyestuff from the solution with common salt.

Signed at Frankfort-on-the-Main, in the Province of Hesse-Nassau and Kingdom of Prussia, this 6th day of August, A. D. 1901.

ARTHUR WEINBERG.
RICHARD HERZ.

Witnesses:
JEAN GRUND,
CARL GRUND.